United States Patent
Burger et al.

(10) Patent No.: US 8,135,702 B2
(45) Date of Patent: Mar. 13, 2012

(54) ELIMINATING UNNECESSARY STATISTICS COLLECTIONS FOR QUERY OPTIMIZATION

(75) Inventors: Louis M. Burger, Escondido, CA (US); Frank Roderic Vandervort, Ramona, CA (US)

(73) Assignee: Teradata US, Inc., Dayton, OH (US)

( * ) Notice: Subject to any disclaimer, the term of this patent is extended or adjusted under 35 U.S.C. 154(b) by 595 days.

(21) Appl. No.: 12/290,088

(22) Filed: Oct. 27, 2008

(65) Prior Publication Data

US 2010/0106708 A1    Apr. 29, 2010

(51) Int. Cl.
*G06F 17/30*    (2006.01)

(52) U.S. Cl. ........ 707/718; 707/713; 707/716; 707/719; 707/721

(58) Field of Classification Search ........... 707/999.002, 707/713–720

See application file for complete search history.

(56) References Cited

U.S. PATENT DOCUMENTS

| | | | |
|---|---|---|---|
| 6,801,903 B2 * | 10/2004 | Brown et al. .................. | 1/1 |
| 7,499,907 B2 * | 3/2009 | Brown et al. .................. | 1/1 |
| 7,739,269 B2 * | 6/2010 | Chaudhuri et al. ........... | 707/718 |
| 7,805,411 B2 * | 9/2010 | Ziauddin et al. .............. | 707/688 |
| 7,877,381 B2 * | 1/2011 | Ewen et al. ................... | 707/719 |
| 8,032,522 B2 * | 10/2011 | Goldstein et al. ............. | 707/718 |
| 2005/0267877 A1 * | 12/2005 | Chaudhuri et al. ............ | 707/3 |
| 2007/0226186 A1 * | 9/2007 | Ewen et al. .................... | 707/3 |
| 2007/0239656 A1 * | 10/2007 | Santosuosso .................. | 707/2 |

* cited by examiner

*Primary Examiner* — Debbie Le
(74) *Attorney, Agent, or Firm* — Gates & Cooper LLP; Ramin Mahboubian

(57) ABSTRACT

A method and system for eliminating unnecessary statistics collections for query optimization in a database stored on a computer. Statistics are unnecessary when a re-generated query execution plan that does not use the statistics is equivalent to an original query execution plan that uses the statistics. To determine this, an original query execution plan is created for each query in a specified workload using the statistics in the database. A search is performed of the statistics in order to enumerate one or more candidate sets of statistics to be eliminated. One or more of the candidate sets of statistics are removed from consideration prior to creating the re-generated query execution plan for each query in the specified workload. The re-generated query execution plan, which was created with one or more of the candidate sets of statistics removed from consideration, is compared with the original query execution plan, which was created using the statistics, in order to determine whether the re-generated query execution plan and the original query execution plan are equivalent. The one or more of the candidate sets of statistics removed from consideration are identified as unnecessary when the re-generated query execution plan and the original query execution plan are equivalent.

22 Claims, 3 Drawing Sheets

ELIMINATING UNNECESSARY STATISTICS COLLECTIONS FOR QUERY OPTIMIZATION

BACKGROUND OF THE INVENTION

1. Field of the Invention

This invention relates in general to database management systems performed by computers, and in particular, to an automated system for eliminating unnecessary statistics collections for query optimization.

2. Description of Related Art

Relational DataBase Management Systems (RDBMS) using a Structured Query Language (SQL) interface are well known in the art for use in data warehouses. The SQL interface has evolved into a standard language for RDBMS software and has been adopted as such by both the American National Standards Institute (ANSI) and the International Standards Organization (ISO).

In an RDBMS, all data is externally structured into tables. A table in a relational database is two dimensional, consisting of rows and columns. Each column has a name, typically describing the type of data held in that column. As new data is added, more rows are inserted into the table. A user query selects some rows of the table by specifying clauses that qualify the rows to be retrieved based on the values in one or more of the columns.

The SQL interface allows users to formulate relational operations on the tables either interactively, in batch files, or embedded in host languages such as C, COBOL, etc. Operators are provided in SQL that allow the user to manipulate the data, wherein each operator performs functions on one or more tables and produces a new table as a result. The power of SQL lies on its ability to link information from multiple tables or views together to perform complex sets of procedures with a single statement.

One of the most common SQL queries executed by the RDBMS is the SELECT statement, which is used to perform a query. In the SQL standard, the SELECT statement generally comprises the format: "SELECT<clause> FROM<clause>WHERE<clause>GROUP BY<clause> HAVING<clause>ORDER BY<clause>." The clauses generally must follow this sequence, but only the SELECT and FROM clauses are required.

Generally, the result of a SELECT statement is a subset of data retrieved by the RDBMS from one or more existing tables stored in the relational database, wherein the FROM clause identifies the name of the table or tables from which data is being selected. The subset of data is treated as a new table, termed the result table.

Optimization is typically performed before the execution of SQL statements in order to improve query performance. Query performance is often dependent on the size and physical design of the database. Thus, a query optimizer in an RDBMS relies on statistics collections to accurately choose an efficient execution plan.

Typically, users are responsible for identifying the specific columns and indexes on which to collect statistics. For example, users may collect optimizer statistics on a specified column or index of a table using the SQL command syntax shown below:

COLLECT STATISTICS
 ON<table_name><column_or_index>

Other similar commands may have different but similar SQL command syntax.

The process of collecting statistics usually requires scanning and sorting all of the indexed or column data and is thus resource intensive, especially for large tables. In certain instances, this may mean that a significant percentage of overall system resources is devoted solely to collecting statistics. Hence, it is critical that users correctly identify only those columns and indexes that truly benefit from statistics collection.

Unfortunately, this is difficult for most users because it requires detailed knowledge of a query optimizer's plan selection process and runtime execution strategies. Furthermore, many users continually tune queries in their workloads and, over the course of time, it is not uncommon for them to accumulate a list of collections that includes hundreds or even thousands of individual columns and indexes. At that point, it is likely that a subset of these statistics collections is no longer necessary to achieve the same workload performance. Of course, it is nearly impossible to manually identify this subset.

Database vendors often provide tools or "wizards" that examine a user's workload and make recommendations regarding query optimizer statistics. However, the current focus of such tools is on the collection of additional statistics to improve query optimizer plan selection, which in turn improves workload performance.

What is lacking with such tools is the capability of recommending the removal of unnecessary statistics collections. More specifically, what is needed is an automated method of determining the minimal set of existing statistics collections necessary to retain the current level of workload performance. The present invention satisfies this need.

SUMMARY OF THE INVENTION

To overcome the limitations in the prior art described above, and to overcome other limitations that will become apparent upon reading and understanding the present specification, the present invention discloses a method and system for eliminating unnecessary statistics collections for query optimization in a database stored on a computer. Statistics are unnecessary when a re-generated query execution plan that does not use the statistics is equivalent to an original query execution plan that uses the statistics. To determine this, an original query execution plan is created for each query in a specified workload using the statistics in the database. A search is performed of the statistics in order to enumerate one or more candidate sets of statistics to be eliminated. One or more of the candidate sets of statistics are removed from consideration prior to creating the re-generated query execution plan for each query in the specified workload. The re-generated query execution plan, which was created with one or more of the candidate sets of statistics removed from consideration, is compared with the original query execution plan, which was created using the statistics, in order to determine whether the re-generated query execution plan and the original query execution plan are equivalent. The one or more of the candidate sets of statistics removed from consideration are identified as unnecessary when the re-generated query execution plan and the original query execution plan are equivalent.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Environment

Figure 1:
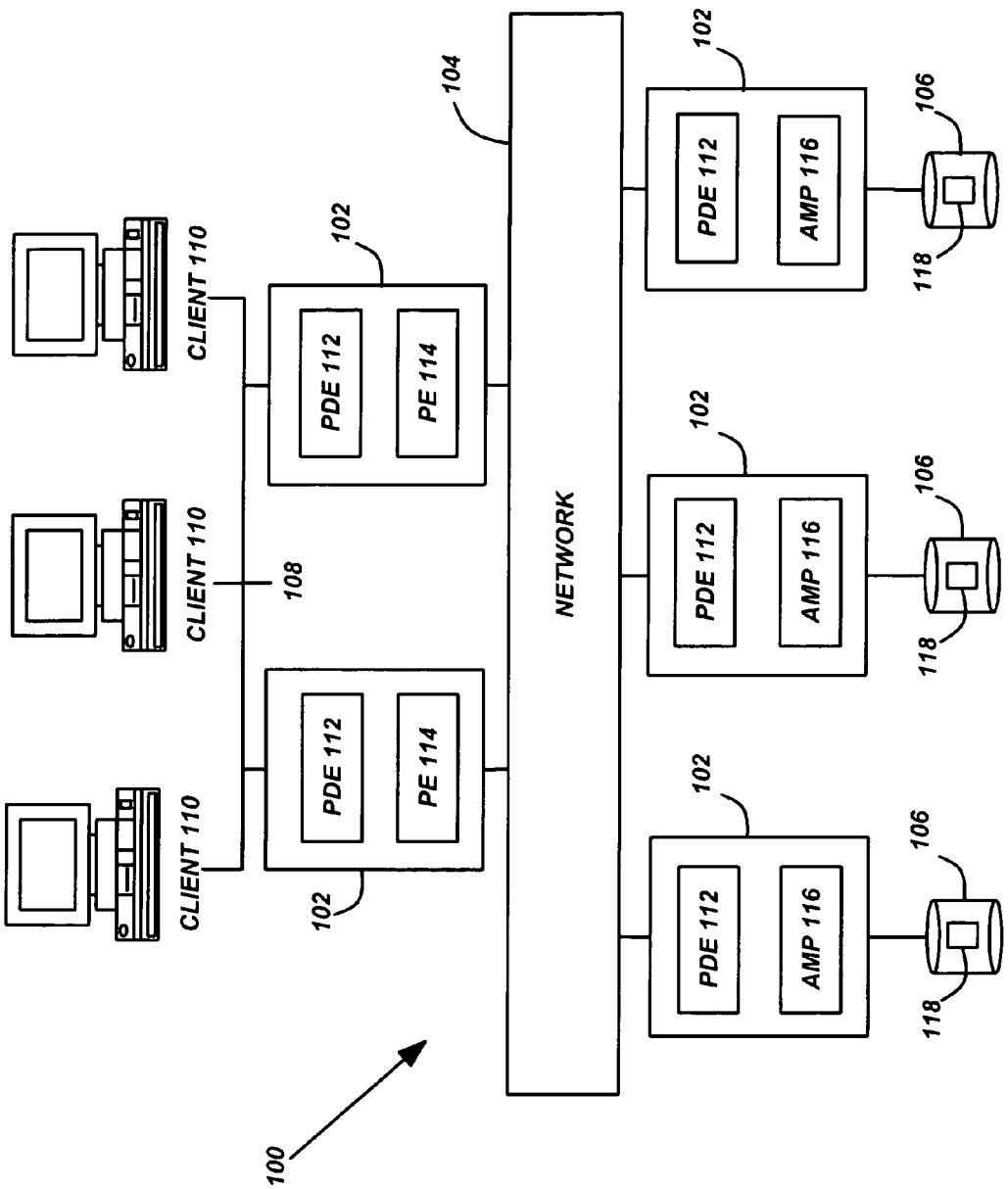
FIG. 1 illustrates an exemplary hardware and software environment that could be used with the preferred embodiment of the present invention.

FIG. 1 illustrates an exemplary hardware and software environment that could be used with the preferred embodiment of the present invention. In the exemplary environment, a computer system 100 is comprised of one or more processing units (PUs) 102, also known as processors or nodes, which are interconnected by a network 104. Each of the PUs 102 is coupled to zero or more fixed and/or removable data storage units (DSUs) 106, such as disk drives, that store one or more relational databases. Further, each of the PUs 102 is coupled to zero or more data communications units (DCUs) 108, such as network interfaces, that communicate with one or more remote systems or devices.

Operators of the computer system 100 typically use a client 110, such as a terminal, workstation, computer, or other input device to interact with the computer system 100. This interaction generally comprises statements that conform to the Structured Query Language (SQL) standard, and extensions thereto, and invoke functions performed by a Relational DataBase Management System (RDBMS) executed by the system 100.

In the preferred embodiment of the present invention, the RDBMS comprises the Teradata® product offered by Teradata Corporation, the assignee of the present invention, and includes one or more Parallel Database Extensions (PDEs) 112, Parsing Engines (PEs) 114, and Access Module Processors (AMPs) 116. These components of the RDBMS perform the functions necessary to implement the RDBMS and SQL functions, i.e., definition, compilation, interpretation, optimization, database access control, database retrieval, and database update.

Generally, the PDEs 112, PEs 114, and AMPs 116 comprise instructions and/or data that are tangibly embodied in and/or accessible from a device or media, such as RAM, ROM, one or more of the DSUs 106, and/or a remote system or device communicating with the computer system 100 via one or more of the DCUs 108. The PDEs 112, PEs 114, and AMPs 116 each comprise instructions and/or data which, when executed, invoked, and/or interpreted by the PUs 102 of the computer system 100, cause the necessary steps or elements of the present invention to be performed.

Those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

In the preferred embodiment, work is divided among the PUs 102 in the system 100 by spreading the storage of a partitioned relational database 118 managed by the RDBMS across multiple AMPs 116 and the DSUs 106 (which are managed by the AMPs 116). Thus, a DSU 106 may store only a subset of rows that comprise a table in the partitioned database 118 and work is managed by the system 100 so that the task of operating on each subset of rows is performed by the AMP 116 managing the DSUs 106 that store the subset of rows.

The PDEs 112 provides a high speed, low latency, message-passing layer for use in communicating between the PEs 114 and AMPs 116. Further, the PDE 112 is an application programming interface (API) that allows the RDBMS to operate under different operating systems, in that the PDE 112 isolates most of the operating system dependent functions from the RDBMS, and performs many operations such as shared memory management, message passing, and process or thread creation.

The PEs 114 handle communications, session control, optimization and query plan generation and control, while the AMPs 116 handle actual database 118 table manipulation. Preferably, the PEs 114 fully parallelize all functions among the AMPs 116.

The system 100 does face the issue of how to improve workload and query performance through the addition and removal of statistics collections. Specialized functions are necessary for resolving these issues. Such a function is described in more detail below.

Operation of the Statistics Analysis Function

The present invention provides a Statistics Analysis function that analyzes a user-specified workload, automatically determines the minimal set of existing statistics that must be retained to preserve performance of the workload, and then recommends the removal of those statistics that are not part of this set. The Statistics Analysis function relies on two important insights: (1) there exists a large class of possible statistics that may be factored into the optimizer's costing process but have no bearing on the optimizer's final choice of plan, and (2) the recognition that it is acceptable to sacrifice accuracy in optimizer costing as long as an optimal plan is still chosen.

Figure 2:
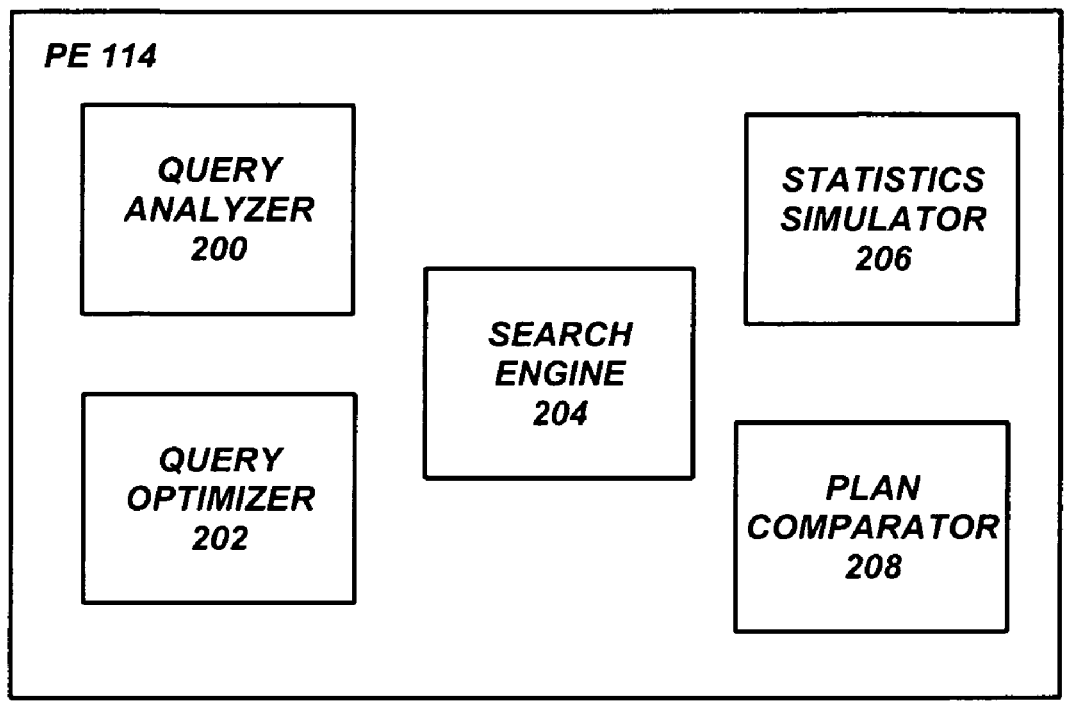
FIG. 2 is a block diagram that illustrates the components used with the preferred embodiment of the present invention.

FIG. 2 is a block diagram that illustrates the components used in the Statistics Analysis function according to the preferred embodiment of the present invention. Using these components, the Statistics Analysis function assists users in tuning their physical database design by analyzing a given workload, and then recommending the removal of existing but unnecessary statistics.

The Statistics Analysis function includes a user interface performed by the Client 110 and various back-end components of the PE 114 that contain the intelligence for evaluating queries, plans and their statistics. These components of the PE 114 include a Query Analyzer 200, Query Optimizer 202, Search Engine 204, Statistics Simulator 206, and Plan Comparer 208, which perform the following functions:

The Query Analyzer 200 analyzes a query to determine which tables are referenced and generates the list of column and index statistics that currently exist on those tables.

The Search Engine 204 performs a combinatorial search algorithm capable of performing a random search on a large solution space of candidate sets of statistics that are formed by considering various combinations of the statistics generated by the Query Analyzer 200.

The Statistics Simulator 206 simulates the non-existence (removal) of one or more existing sets of statistics during the course of query generation and optimization.

The Plan Comparer 208 compares two Query Optimizer 202 plans and returns a "true" indicator if they are equivalent.

The Query Optimizer 202 is a standard (unaltered) query optimizer that generates and optimizes query execution plans.

In one embodiment, the Statistics Analysis function is invoked using the following SQL statement:

```
INITIATE STATISTICS ANALYSIS
    [ON<table_list>]
    FOR<workload>IN<query_capture_database>;
``` wherein [ ] denote an optional syntax element and <workload> is the name previously associated with one or more queries.

The result from executing this SQL statement is a set of drop recommendations, in the form of "DROP STATISTICS" SQL statements, applied to columns or indexes of the tables specified in <table_list>. If <table_list> is not specified, all tables referenced in <workload> are considered for statistics removal. The drop recommendations are stored within a named set of pre-defined dictionary tables that is identified by <query_capture_database>.

The overall approach taken by the Statistics Analysis function is to let the Query Optimizer 202 decide which statistics it can live without. To achieve this, the Statistics Analysis function performs a search for existing statistics in the database that potentially could be eliminated, and then simulates removal of the existing statistics from the database in order to determine whether the statistics are unnecessary. In this regard, the Query Optimizer 202 is repeatedly invoked to perform query plan generation and optimization on a specified workload using different candidate sets of statistics for a specified list of tables in the database, where the candidate sets of statistics are temporarily removed prior to plan generation. The largest set of removed statistics, i.e., the smallest set of maintained statistics, that preserves existing query execution plans is retained as the drop recommendation.

Plan preservation is determined by comparing "before" and "after" plans generated by the Query Optimizer 202 to see if they are equivalent. Equivalency is based on the comparison of "plan directives," which are all of the chosen execution methods of the Query Optimizer 202 and include single table access paths (e.g., choice of index), join order, binary join methods, and data redistribution strategies. Plan directives do not include estimated costs, which will naturally vary when certain statistics are removed from the estimation process.

The Statistics Analysis function is performed by first calling the Query Optimizer 202 to generate and save a plan for each query in the workload using all existing statistics available. The saved plans are stored in the Query Optimizer's 202 internal representation for an execution plan, which in one embodiment is referred to as "plastic steps." Alternatively, if the system supports a formal "plan directive" feature that allows users to influence Query Optimizer 202 choices, the saved plans are stored in the internal representation used for directives. For each query, the system also invokes the Query Analyzer 200 to generate the list of existing statistics for all tables being analyzed.

The list of existing statistics is then passed to the Search Engine 204, which uses the list to enumerate candidate sets of statistics to be dropped. For each candidate set, the Search Engine 204 invokes the Statistics Simulator 206 to remove the statistical information from the current session's private dictionary information for fields and indexes. The Query Optimizer 202 is then invoked to re-generate the plan for the first query in the workload and resulting re-generated plan is passed along with the original plan to the Plan Comparer 208 to determine if they are equivalent. If the re-generated plan and the original plan are equivalent, the process is repeated for the next query in the workload; otherwise, the current candidate set is abandoned and control returns to the Search Engine 204 to enumerate another candidate set.

For each candidate set of statistics that results in a re-generated plan that is equivalent to an original plan for every query in the workload, the candidate set is compared against the currently saved best set, if any, on the basis of cost. The cost may include actual or estimated statistics collection times, wherein the candidate set with the largest cumulative collection time is considered the best set; otherwise, the cost may include actual or estimated statistics collection size, wherein the candidate set with the largest number of individual collections is retained as the best set.

The Statistics Analysis function ends after the Search Engine 204 completes its random search of the solution space and the resulting best candidate set (if any) is written to the specified <query_capture_database> in the form of "DROP STATISTICS" SQL statements. Users can then query this query capture database to view the recommendations, as well as consider and perform their actual implementation.

The quality of the drop recommendations produced by the Statistics Analysis function is very high, because the decision making process incorporates the standard Query Optimizer 202. In particular, the simulated impact of removing statistics during the Statistics Analysis function should be the same as the actual impact after the recommendations are implemented. In addition, the Statistics Analysis function recognizes the need for a combinatorial search algorithm to adequately explore the large space of alternative candidate sets of statistics that could potentially be dropped.

Logic of the Statistics Analysis Function

Figure 3:
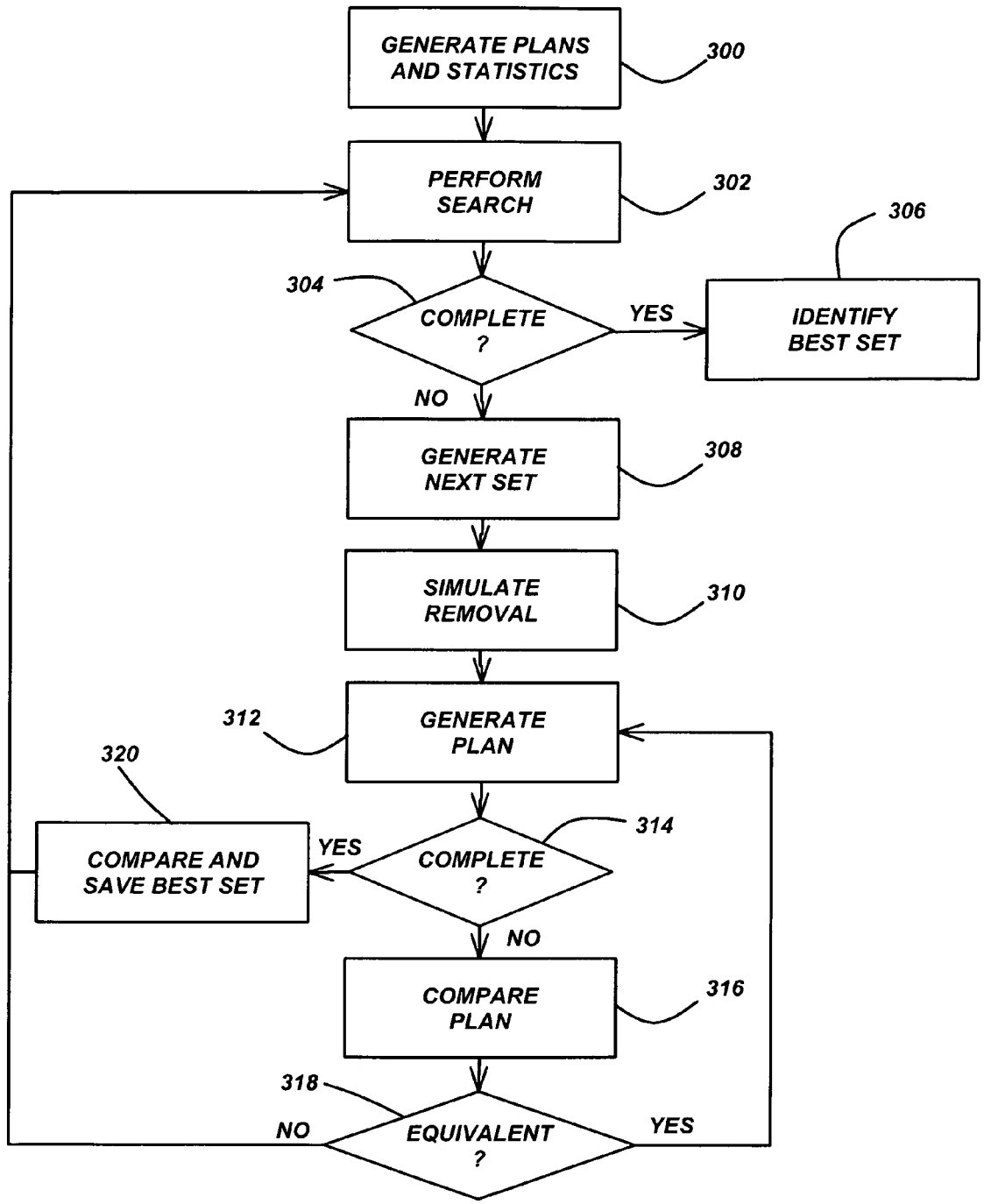
FIG. 3 is a flow chart illustrating the logic of the preferred embodiment of the present invention in eliminating unnecessary statistics collections for query optimization in a database management system performed by a computer.

FIG. 3 is a flow chart illustrating the logic of the preferred embodiment of the present invention in eliminating unnecessary statistics collections for query optimization in a database stored on a computer. Those skilled in the art will recognize that this logic is provided for illustrative purposes only and that different logic may be used to accomplish the same results.

Specifically, this logic represents the Statistics Analysis function invoking the Query Analyzer 200, Query Optimizer 202, Search Engine 204, Statistics Simulator 206, and Plan Comparer 208 to determine whether any unnecessary statistics exist in the database, and then eliminating one or more of the statistics that are unnecessary from the database. Moreover, this logic may be invoked by one or more statements or instructions that cause the computer system 100 to perform the Statistics Analysis function on a specified list of tables in the database for a specified workload.

Block 300 represents the Statistics Analysis function invoking the Query Analyzer 200 to create an original query execution plan for each query in the specified workload using all available statistics existing in the database 118. This Block also represents the Statistics Analysis function generating and saving a list of all available statistics existing in the database 118 for all tables specified in each query in the specified workload.

Block 302 represents the Statistics Analysis function invoking the Search Engine 204 to perform a combinatorial search of the list of all available statistics, in order to enumerate one or more candidate sets of statistics to be eliminated. For each candidate set of statistics, the Blocks 304-320 are performed.

Block 304 is a decision block that represents the Statistics Analysis function determining whether the search is complete, i.e., there are no more candidate sets of statistics to consider. If so, control transfers to Block 306; otherwise, control transfers to Block 308.

Block 306 represents the Statistics Analysis function identifying the current best candidate set of statistics and generating a set of drop recommendations, for example, in the form of "DROP STATISTICS" SQL statements applied to columns or indexes of the tables specified in the <table_list>. In addition, at this block, the Statistics Analysis function may issue a report, or display a message and prompt the user for further processing, such as the actual invocation of the "DROP STATISTICS" SQL statements in order to remove the identified statistics from the database.

Block 308 represents the Statistics Analysis function invoking the Search Engine 204 to identify or generate the next candidate set of statistics to be analyzed.

Block 310 represents the Statistics Analysis function invoking the Statistics Simulator 206 to simulate the removal of the candidate set of statistics from consideration prior to plan generation. Alternatively, the Statistics Simulator 206 may temporarily remove the candidate set of statistics from the database 118 prior to plan generation.

Block 312 represents the Statistics Analysis function invoking the Query Optimizer 202 to re-generate a query execution plan for the next query in the workload.

Block 314 is a decision block that represents the Statistics Analysis function determining whether there are no further queries in the workload and thus no further plans to re-generate. If not, control transfers to Block 316; otherwise, control transfers to Block 320.

Block 316 represents the Statistics Analysis function invoking the Plan Comparator 208 to compare the re-generated query execution plan (which was generated with the candidate set of statistics removed from consideration) with the original query execution plan generated at Block 300 (which was generated using all available statistics), in order to determine whether the plans are equivalent.

Block 318 is a decision block that represents the Statistics Analysis function determining whether the comparison in Block 316 indicates that the re-generated and original query execution plans are equivalent. What this means is that the candidate set of statistics is unnecessary, namely, the original query that uses the statistics is matched or nearly matched in performance by the re-generated query that does not use the statistics. If so, control transfers to Block 312 to re-generate a plan for the next query in the workload; otherwise, the current candidate set of statistics is abandoned and control returns to Block 302 to enumerate another candidate set of statistics.

Block 320 represents the Statistics Analysis function, for each candidate set of statistics that results in a re-generated plan that is equivalent to the original plan for every query in the workload, comparing the candidate set of statistics against the currently saved best candidate set of statistics (if any). As noted above, if the dictionary information for individual statistics includes actual or estimated collection times, the candidate set of statistics with the largest cumulative collection time is considered the best; otherwise, the candidate set of statistics with the largest number of individual statistics collections is retained as the best.

Thereafter, control transfers to Block 302 to repeat the logic.

Conclusion

This concludes the description of the preferred embodiment of the invention. The following describe some alternative embodiments for accomplishing the same invention. In one alternative embodiment, any type of computer, such as a mainframe, minicomputer, or personal computer, could be used to implement the present invention. In addition, any DBMS that uses statistics could benefit from the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of managing statistics collections stored on a computer readable storage medium and used to optimize execution of queries associated with a database, the computer-implemented method comprising:
   (a) determining whether one or more of the statistic collections are unnecessary for optimization of at least one query associated with the database, by determining whether a re-generated query execution plan, for the at least one query, that does not use the one or more of the statistics collections is equivalent to an original query execution plan for the at least one query, that uses the one or more statistics collections; and
   eliminating the one or more statistic collections from the computer readable storage medium when the determining (a) determines that the one or more statistic collections are unnecessary.

2. The method of claim 1, wherein the method further comprises:
   deleting or removing the one or more statistic collections from the computer readable storage medium when the determining (a) determines that the one or more statistic collections are unnecessary.

3. A computer-implemented method managing statistics collections used to optimize execution of queries associated with a database, the computer-implemented method comprising:
   creating an original query execution plan for at least one query in a specified workload using the statistics;
   performing a search of the statistics in order to enumerate one or more candidate sets of statistics to be eliminated;
   removing one or more of the candidate sets of statistics from consideration prior to creating a re-generated query execution plan for the at least one query in the specified workload;
   comparing the re-generated query execution plan, which was created with one or more of the candidate sets of statistics removed from consideration, with the original query execution plan, which was created using the statistics, in order to determine whether the re-generated query execution plan and the original query execution plan are equivalent;
   identifying the one or more of the candidate sets of statistics removed from consideration as unnecessary when the re-generated query execution plan and the original query execution plan are equivalent; and
   eliminating the one or more of the candidate sets identified as unnecessary.

4. The method of claim 3, further comprising identifying one of the candidate set of statistics identified as unnecessary as being a best candidate set of statistics for elimination.

5. The method of claim 4, wherein the candidate set of statistics identified as unnecessary with a largest cumulative collection time is the best candidate set of statistics for elimination.

6. The method of claim 4, wherein the candidate set of statistics identified as unnecessary with a largest number of individual statistics collections is the best candidate set of statistics for elimination.

7. The method of claim 3, further comprising creating drop recommendations for the candidate set of statistics identified as unnecessary.

8. A system for managing statistics collections used to optimize execution of queries associated with a database, wherein the system includes one or more processors operable to:
   determine whether one or more of the statistic collections that are stored on a computer readable storage medium are unnecessary for optimization of at least one query associated with the database, by determining whether a re-generated query execution plan, for the at least one query, that does not use the one or more of the statistics collections is equivalent to an original query execution plan, for the at least one query, that uses the one or more statistics collections;
   eliminating the one or more statistic collections from the computer readable storage medium when the determining determines that the one or more statistic collections are unnecessary.

9. The system of claim 8, wherein the one or more processors are also operable to:
   delete or remove the one or more statistic collections from the computer readable storage medium when the determining determines that the one or more statistic collections are unnecessary.

10. A system for managing statistics collections used to optimize execution of queries associated with a database, wherein the system includes one or more processors operable to:
   create and original query execution plan for at least one query in a specified workload using the statistics in the database;
   perform a search of the statistics in order to enumerate one or more candidate sets of statistics to be eliminated;
   remove one or more of the candidate sets of statistics from consideration prior to creating the re-generated query execution plan for each query in the specified workload;
   compare the re-generated query execution plan, which was created with one or more of the candidate sets of statistics removed from consideration, with the original query execution plan, which was created using the statistics, in order to determine whether the re-generated query execution plan and the original query execution plan are equivalent; and
   identify the one or more of the candidate sets of statistics removed from consideration as unnecessary when the re-generated query execution plan and the original query execution plan are equivalent; and
   eliminate the one or more of the candidate sets identified as unnecessary.

11. The system of claim 10, wherein the one or more processors are further operable to identify one of the candidate set of statistics identified as unnecessary as being a best candidate set of statistics for elimination.

12. The system of claim 11, wherein the candidate set of statistics identified as unnecessary with a largest cumulative collection time is the best candidate set of statistics for elimination.

13. The system of claim 11, wherein the candidate set of statistics identified as unnecessary with a largest number of individual statistics collections is the best candidate set of statistics for elimination.

14. The system of claim 10, wherein the one or more processors are further operable to create drop recommendations for the candidate set of statistics identified as unnecessary.

15. The method of claim 1, wherein the method further comprises:
   identifying and/or marking the one or more statistic collections as unnecessary for query optimization when the determining (a) determines that the one or more statistic collections are unnecessary.

16. A non-transient computer readable storage medium storing at least executable computer code to manage statistics collections used to optimize execution of queries associated with a database, wherein the executable computer code includes:
   executable computer code operable to (a) determine whether one or more of the statistic collections are unnecessary for optimization of at least one query associated with the database, by determining whether a re-generated query execution plan that does not use the one or more of the statistics collections is equivalent to an original query execution plan for the at least one query that uses the one or more statistics collections; and
   executable computer code operable to eliminate the one or more statistic collections when the determining (a) determines that the one or more statistic collections are unnecessary.

17. The non-transient computer readable storage medium as recited in claim 16, wherein the non-transient computer readable storage medium further includes:
   executable computer code operable to delete or remove the one or more statistic collections from the computer readable storage medium when the determining (a) determines that the one or more statistic collections are unnecessary.

18. The non-transient computer readable storage medium as recited in claim 16, wherein the non-transient computer readable storage medium further includes:
   executable computer code operable to create an original query execution plan for at least one query in a specified workload using the statistics;
   executable computer code operable to search of the statistics in order to enumerate one or more candidate sets of statistics to be eliminated;
   executable computer code operable to remove one or more of the candidate sets of statistics from consideration prior to creating a re-generated query execution plan for the at least one query in the specified workload;
   executable computer code operable to compare the re-generated query execution plan, which was created with one or more of the candidate sets of statistics removed from consideration, with the original query execution plan, which was created using the statistics, in order to determine whether the re-generated query execution plan and the original query execution plan are equivalent; and
   executable computer code operable to identify the one or more of the candidate sets of statistics removed from consideration as unnecessary when the re-generated query execution plan and the original query execution plan are equivalent.

19. The non-transient computer readable storage medium as recited in claim 18, wherein the non-transient computer readable storage medium further includes:
   executable computer code operable to identify one of the candidate set of statistics identified as unnecessary as being a best candidate set of statistics for elimination.

20. The non-transient computer readable storage medium as recited in claim 19, wherein the candidate set of statistics identified as unnecessary with a largest cumulative collection time is the best candidate set of statistics for elimination.

21. The non-transient computer readable storage medium as recited in claim 19, wherein the candidate set of statistics identified as unnecessary with a largest number of individual statistics collections is the best candidate set of statistics for elimination.

22. The non-transient computer readable storage medium as recited in claim 18, wherein the non-transient computer readable storage medium further includes:
   executable computer code operable to create drop recommendations for the candidate set of statistics identified as unnecessary.

* * * * *